(12) United States Patent
Chen et al.

(10) Patent No.: US 8,095,486 B2
(45) Date of Patent: Jan. 10, 2012

(54) DISCOVERING OPTIMAL SYSTEM CONFIGURATIONS USING DECENTRALIZED PROBABILITY BASED ACTIVE SAMPLING

(75) Inventors: Haifeng Chen, Old Bridge, NJ (US); Guofei Jiang, Princeton, NJ (US); Kenji Yoshihira, Cranford, NJ (US); Hui Zhang, New Brunswick, NJ (US); Xiaoqiao Meng, Plainsboro, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 935 days.

(21) Appl. No.: 12/042,728

(22) Filed: Mar. 5, 2008

(65) Prior Publication Data

US 2009/0112780 A1 Apr. 30, 2009

Related U.S. Application Data

(60) Provisional application No. 60/983,311, filed on Oct. 29, 2007.

(51) Int. Cl.
*G06E 1/00* (2006.01)
*G06E 3/00* (2006.01)

(52) U.S. Cl. .............................. 706/19; 709/226; 703/2

(58) Field of Classification Search ....................... None
See application file for complete search history.

(56) References Cited

U.S. PATENT DOCUMENTS

| 7,116,411 | B2 | 10/2006 | Park et al. | |
|---|---|---|---|---|
| 2005/0114397 | A1* | 5/2005 | Doshi et al. | 707/104.1 |
| 2005/0262230 | A1* | 11/2005 | Liu et al. | 709/223 |
| 2006/0013473 | A1* | 1/2006 | Woodfill et al. | 382/154 |

FOREIGN PATENT DOCUMENTS

| KR | 20030003803 Y | 1/2003 |
|---|---|---|
| KR | 20040014542 A | 2/2004 |
| KR | 20060050690 A | 5/2006 |
| WO | 2005074191 A1 | 8/2005 |
| WO | 03052670 A1 | 10/2008 |

* cited by examiner

*Primary Examiner* — Omar Fernandez Rivas
*Assistant Examiner* — Kalpana Bharadwaj
(74) *Attorney, Agent, or Firm* — James Bitetto; Joseph Kolodka

(57) ABSTRACT

A system and method for optimizing system performance includes applying sampling based optimization to identify optimal configurations of a computing system by selecting a number of configuration samples and evaluating system performance based on the samples. Based on feedback of evaluated samples, a location of an optimal configuration is inferred. Additional samples are generated towards the location of the inferred optimal configuration to further optimize a system configuration.

9 Claims, 6 Drawing Sheets

DISCOVERING OPTIMAL SYSTEM CONFIGURATIONS USING DECENTRALIZED PROBABILITY BASED ACTIVE SAMPLING

RELATED APPLICATION INFORMATION

This application claims priority to provisional application Ser. No. 60/983,311 filed on Oct. 29, 2007, incorporated herein by reference.

BACKGROUND

1. Technical Field

The present invention relates to optimization of computer systems and more particularly to systems and methods using a decentralized probability active sampling approach for improving computer system performance.

2. Description of the Related Art

Performance of a computing system is significantly dependent on the choice of its various configuration parameters. An appropriate configuration setting can lead the system to the best quality of services (QoS) such as short response time, high throughput, and fairness among users. However, the growing scalability, complexity, and heterogeneity of current computing systems create many challenges in determining an optimal configuration setting for system operation. For example, today's data centers commonly include thousands of physical machines to host a variety of web applications. It is difficult for human operators to find the best configuration setting for such large systems.

Currently, a commonly used approach for system configuration relies on the default settings that come with each system component from its vendor. Such default setting gives a conservative way to deploy the system because it ignores the interdependencies among different system components. For example, the configurations of an application server in a web based system depend heavily on the particular application being deployed and the type of back-end database it interacts with. These system components are usually from different vendors. It is likely that non-optimal performance is experienced when these system components work together with their default configurations.

Therefore, a need exists to develop methods to automatically discover a configuration setting that can optimize the performance of a computing system in its entirety.

Due to the increasing complexity of computing systems, the automatic identification of a system's optimal configuration is important to large system optimization and management. Several approaches have been developed in recent years to deal with this problem. These approaches formulized the problem as an optimization problem and resorted to different algorithms to search for the best configuration. However, compared with many standard optimization techniques such as gradient based algorithms, these algorithms are dealing with an unknown, non-convex function with multiple local maxima.

A recursive random sampling (RRS) approach has been used to discover a configuration space based on the initial high efficiency feature of random sampling as well as the constantly restarting mechanism for random sampling with adjusted sampling space. A smart hill climbing (SHC) algorithm has also been proposed using the ideas of importance sampling and Latin Hypercube Sampling (LHS). This approach estimated a local function at each potential region and searched towards the steepest decent direction of the estimated function.

In the Active Harmony project, a simplex based direct search was utilized to optimize the unknown performance function with respect to configuration settings. This method forms a simplex in the parameter space by a number of samples, and iteratively updates the simplex through actions including reflection, expansion and contraction to guide the new sample generation. However, the simplex based search only works for a small number of configuration parameters, and is easy to get stuck in local optima.

When the number of parameters is large, another approach decomposed the configuration parameters into several small subsets by modeling the dependencies between different parameters. The simplex method is then conducted in each subset of parameters. Other approaches where also proposed.

SUMMARY

Compared with the conventional approaches, the present configuration discovery method has at least the following distinguished features: 1) We introduce a general way to evaluate system performance by incorporating multiple performance dimensions, so that the system providers can flexibly define their own expectation of good system performance. 2) Our proposed decentralized probability based active sampling (DPAS) can be implemented in a decentralized fashion to meet the demand of a growing number of configuration parameters in computing systems. 3) Furthermore, experimental results demonstrate that our DPAS system and method performs better than current configuration identification techniques.

In one embodiment, if we consider the system performance as a function of its configuration setting, the configuration discovery can be regarded as an optimization process on that function. However, in reality such dependency function is usually unavailable due to the complexity of computing systems. As an alternative, we treat the system as a black-box and apply sampling based optimization to identify optimal configurations. That is, we select a number of configuration samples and test the system performance on those samples. Based on feedback of evaluated samples, the optimization process makes an inference of the location of optimal configuration and then generates more samples towards that direction. Note the underlying performance function is complex and has many local maxima. A good sampling process has to consider both the global coverage as well as the local structure of some promising areas in the configuration space. Furthermore, the time cost to perform system performance evaluation is not trivial in the optimization process. For a web based system, it usually takes around 20 minutes to run the system to collect reliable performance measurements for evaluation. Therefore, it is beneficial to be able to identify the optimal configuration with minimum number of samples.

A system and method for optimizing system performance includes applying sampling based optimization to identify optimal configurations of a computing system by selecting a number of configuration samples and evaluating system performance based on the samples. Based on feedback of evaluated samples, a location of an optimal configuration is inferred. Additional samples are generated towards the location of the inferred optimal configuration to further optimize a system configuration.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
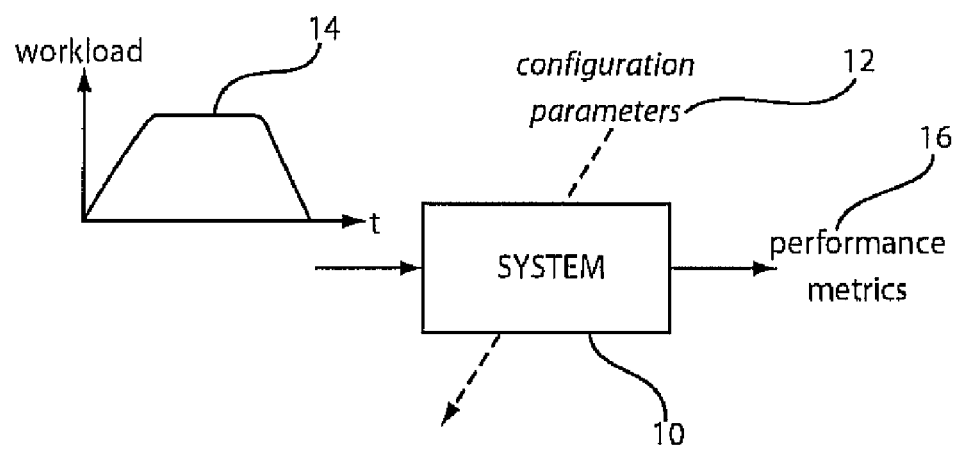
FIG. 1 is a schematic diagram showing a basic system in accordance with the present principles.

With the increasing complexity of large scale computing systems, it is beyond normal human abilities to tune their numerous configuration parameters for best system performance. In accordance with the present principles, a decentralized probability based active sampling (DPAS) approach is employed to automatically determine a system's optimal configurations. In one illustrative embodiment, configuration discovery is treated as a black-box optimization problem, and a search for the solution is achieved by evaluating a finite number of configuration samples. The DPAS system/method provides an efficient sampling strategy which utilizes the experience from past samples to build a probability for generating new samples. Such probability is dynamically updated for each evaluated sample based on a reward-penalty strategy so that the strategy eventually leads the search process towards an optimal setting. Furthermore, the DPAS based optimization can be decomposed into a set of separate modules, each of which is responsible for the search of a specific configuration parameter.

As a consequence, the system/method in accordance with the present principles can be implemented in a decentralized fashion which scales well for a large number of configuration parameters. One system/method embodiment is compared with conventional configuration search methods in experiments by using a benchmark function as well as a real web based test bed system. The experiments demonstrate that the present system/method outperforms other methods in terms of the final identified solution in the complex parameter space.

The decentralized probability based active sampling (DPAS) approach has several advantageous features in terms of system performance metrics, optimization and implementation. For example, instead of focusing on a single performance metric such as the system response time, a more general way to evaluate system performance from multiple perspectives including system throughput, request response time and rejection rate is presented. Guided by such performance metrics, a decentralized way to search system optimal configurations, which scales well for systems with a large collection of configurations and parameters distributed across many different machines, is achieved. The configuration search is decomposed into a number of separate modules (called agents), each of which is responsible for the optimization of a specific parameter. An agent divides the range of its related parameter into a number of bins and keeps the best observed performance evaluation for each bin from test samples originated from that bin.

A probability distribution is constructed over the bins based on their best history performances. If one bin has encountered higher evaluation scores than other bins; that bin will get a high probability in generating new samples. Such probability distribution is updated every time a new sample has been evaluated. A reward-penalty based method is used to update the probability so that the search process will eventually converge to the bin that includes the optimal configuration. After that, a local search based on a fitted quadratic function or the like is performed to obtain a solution.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable medium such as a semiconductor or solid state memory, magnetic tape, a removable computer diskette, a random access memory (RAM), a read-only memory (ROM), a rigid magnetic disk and an optical disk, etc.

Referring now to the drawings in which like numerals represent the same or similar elements and initially to FIG. 1, a system 10 for which a best system configuration is to be identified by evaluating a finite number of samples is illustratively shown. A sample represents one specific system configuration setting. Given configuration parameters/values 12, the system 10 is run with a certain workload 14, and the system's performance metrics 16 are evaluated for that sample. The system 10 may include a single computer device, a network of computer devices, a computer program or combinations thereof. A computer device may include a device capable of being configured in more than of way such that an optimal performance may be achieved by selecting a particular configuration parameter or setting.

Conventional methods typically rely on a single metric such as the response time to characterize system performance. In accordance with the present principles, a more general framework is provide to express system performance that covers multiple dimensions such as the system throughput, request response time, request rejection rate, and/or others.

In many web based systems, especially those for e-commerce applications, a service provider desires the system to have a highest throughput possible to maximize its revenue. However, the increase of request volume will at the same time introduce an increase in request response time and rejection rate, which may lead to user dissatisfaction and hence bad publicity for the system. In particular, when the system behavior enters into a "nonlinear zone", the request response time will grow dramatically while the system throughput may decrease, To improve the system throughput as well as provide certain guarantees on the system response time and availability to attract more users, a multiple performance measure is considered including the response time R, throughput X, and request rejection rate L to define the overall system performance. We introduce the concept of a utility function, similar to such a function employed in the economics field, to express our expectation of good system performance in terms of performance metrics.

A utility function is employed to characterize system performance. This comes from the observation that different values of the performance metric may have different contributions to the overall system performance. For example, the reduction of response time from 2 seconds to 1 second can be less critical to the system performance than the reduction of response time from 8 seconds to 7 seconds because the latter case is more sensitive to user satisfaction of the system. Such knowledge is not included in the expression of mean response time ($\bar{R}$):

$$\bar{R} = \frac{1}{N}\sum_{i=1}^{N} R_i \tag{1}$$

Mean response time is frequently used in the traditional performance evaluation given N completed requests, $\{R_1, R_2, \ldots, R_N\}$, during the evaluation. The utility function $U_1(R)$ can specify the effects of different response time values on the system performance. Large $U(.)$ value means more contribution to good system performance, and vice versa. As a consequence, we can compute the expected utility for the response times of N collected requests as:

$$\bar{U}_1(R) = \frac{1}{N}\sum_{i=1}^{N} R_i U_1(R_i) \tag{2}$$

Note when the function $U_1(R)=1$, the expected utility in Eq. (2) is the same as the mean response time in Eq. (1). Here we use the following function:

$$U_1(R) = \frac{1 + e^{-au}}{1 + e^{n(R-u)}} \tag{3}$$

to differentiate the effects of response times on system performance. There are two parameters, a and u, in Eq. (3) to tune the shape of function, which permits for a flexible characterization of system performance because different systems may have different expectations of good performance.

Figure 2A:
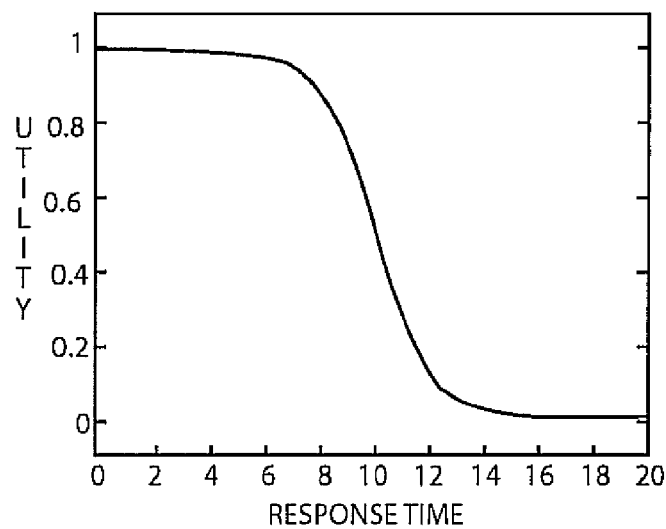
FIG. 2A is a plot showing utility versus response time.
Figure 2B:
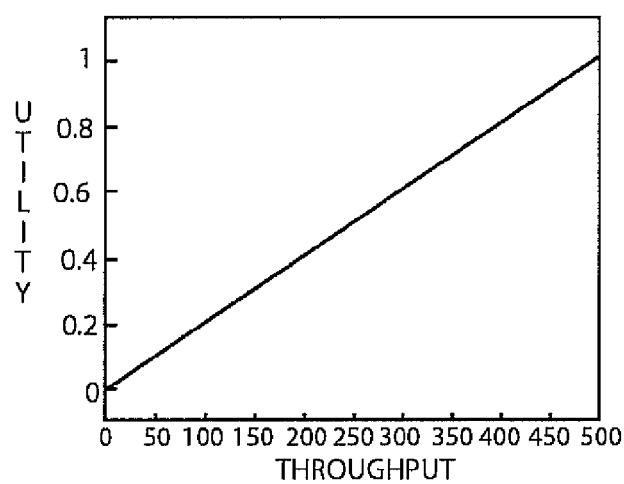
FIG. 2B is a plot showing utility versus throughput.
Figure 2C:
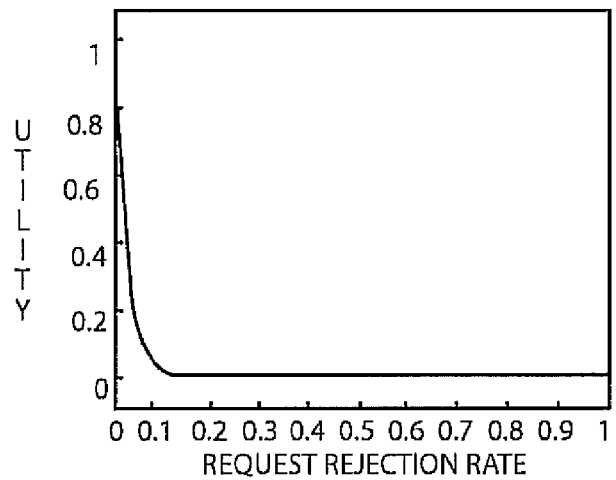
FIG. 2C is a plot showing utility versus request fail rate.

Referring to FIGS. 2A-2C, plots of utility functions for response time (R) (FIG. 2A), throughput (X) (FIG. 2B) and request rejection rate (L) (FIG. 2C) are illustratively shown. In FIG. 2A, Eq. (3) is shown with parameter a=1 and u=10 for the response time expressed in seconds. It can be seen that low response time leads to high utility value. However, when response times are less than a certain value, e.g., 4 seconds in this case, the utility values for response time are similar. This means that once the response time is within that particular range, the response time becomes more meaningful to focus on than on other performance dimensions such as the throughput (X) and request rejection rate (L). Similarly, when the response time is larger than a higher threshold value, e.g. 15 sec, the utility function is almost zero. This avoids unnecessary effort, such as using many resources to improve the response time from 60s to 40s because such improvement will not introduce much gain from the perspective of user satisfaction.

In FIG. 2B, the same description as employed for system performance can be applied with respect to the throughput X. We divide the evaluation period into T intervals and collect the average throughput for each interval which results in T throughput measurements $\{X_1, X_2, \ldots, X_T\}$. The system performance in terms of throughput is represented by its expected utility:

$$\bar{U}_2(X) = \frac{1}{T}\sum_{i=1}^{T} X_i U_2(X_i), \tag{4}$$

where $U_2(X_i)$ is the utility function of the throughput. Note $U_2(X_i)$ is different from the utility function of response time since we always expect the system to have high throughput. As a result, we define:

$$U_2(X) = \frac{X}{X_{max}} \tag{5}$$

where $X_{max}$ is the maximum throughput the system is expected to provide. FIG. 2B plots the utility function with $X_{max}=500$.

In terms of request rejection rate, we use an exponential function, $U_3(L)=e^{-cL}$ (6), to express its utility because a slight increase of request loss will introduce significant effects on the users' experience with the system. In addition, if the request failure rate is higher than, say, 10 percent, the system may lose a lot of users who instead 'click' to other web sites. Note since the request loss rate L is calculated from the whole evaluation period, its expected utility is $\bar{U}_3(L)=U_3(L)$ As a whole, the overall system performance is characterized as the composition of three expected utilities: $\bar{U}=w_1 \bar{U}_1(R)+w_2\bar{U}_2(X)+w_3\bar{U}_3(L)$ (7). The weights $w_1$, $w_2$ and $w_3$ control the importance of each element in the final performance metric. Their values can be set differently for different applications. In our experiment, we choose $w_1=w_2=w_3=1$. As a result, the range of system utility value is between 0 and 3.

UTILITY GUIDED ACTIVE SAMPLING: Given p configuration parameters of the system, $x=[x_1, x_2, \ldots, x_p]^T$, our goal is to find the optimal setting $\tilde{x}=[\tilde{x}_1,\tilde{x}_2, \ldots, \tilde{x}_p]^T$ that can bring the highest system utility defined in Eq. (7). Suppose the system utility can be expressed as a function of configurations, $\bar{U}=[x_1, x_2, \ldots, x_p]$, we are actually solving the following optimization problem: $[\tilde{x}_1,\tilde{x}_2, \ldots, \tilde{x}_p]=\arg_{x_1,x_2,\ldots x_p}$ max $f(x_1,x_2,\ldots,x_p)$. (8).

Since the function $f(\bullet)$ is usually unknown in practical applications, we rely on sampling based function evaluations to discover the optimal parameters. We need an intelligent way to efficiently explore the configuration space and find the optimal parameter setting with minimum number of sample evaluations. One important element of intelligent sampling is to utilize the experience from past samples for the inference of the location of samples that can significantly improve the system utility. For example, suppose we have already performed function evaluations on m samples. $x_{(1)}, x^{(2)}, \ldots, x^{(m)}$, the new sample $x^{(m+1)}$ is generated by: $x^{(m+1)} \leftarrow M(x^{(1)}, \ldots, x^{(m)}, f(x^{(1)}), \ldots, f(x^{(m)}))$ (9) where $M(\bullet)$ represents the strategy of generating new samples towards the optimal solution. In the following, a probabilistic based active sampling approach is proposed to accomplish the functionality of $M(\bullet)$ Probabilistic Sampling: For each variable $x_i$, we define a function:

$$g_i(x_i) = \max_{x_1,\ldots,x_{i-1},x_{i+1},\ldots,x_p} f(x_1, \ldots, x_{i-1}, x_i, x_{i+1}, \ldots x_p) \quad (10)$$

to represent the maximum of function $f(\bullet)$ over all parameters except $x_i$. It can be regarded as the projection of the maximum of function $f(\bullet)$ on the $x_i$ coordinate.

Figure 3:
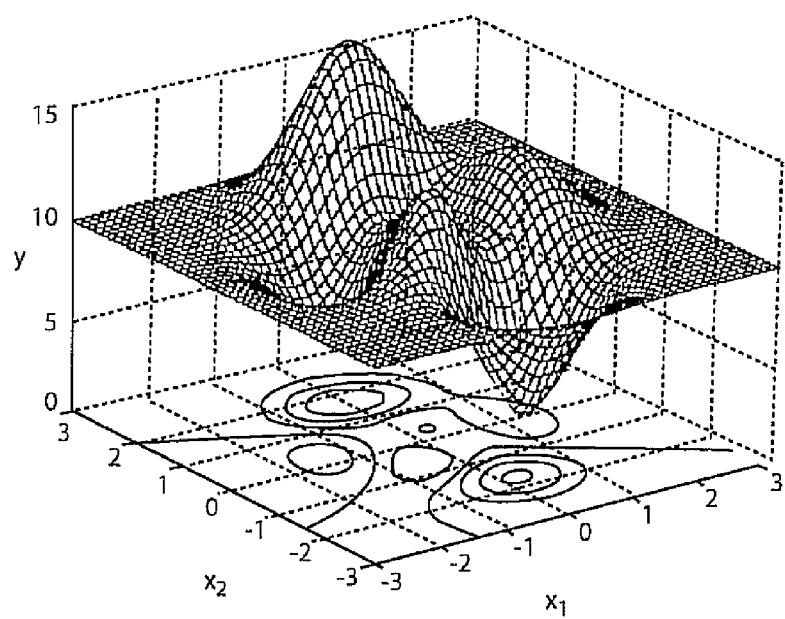
FIG. 3 is a diagram showing a three-dimensional function for demonstrating concepts in accordance with the present principles.
Figure 4:
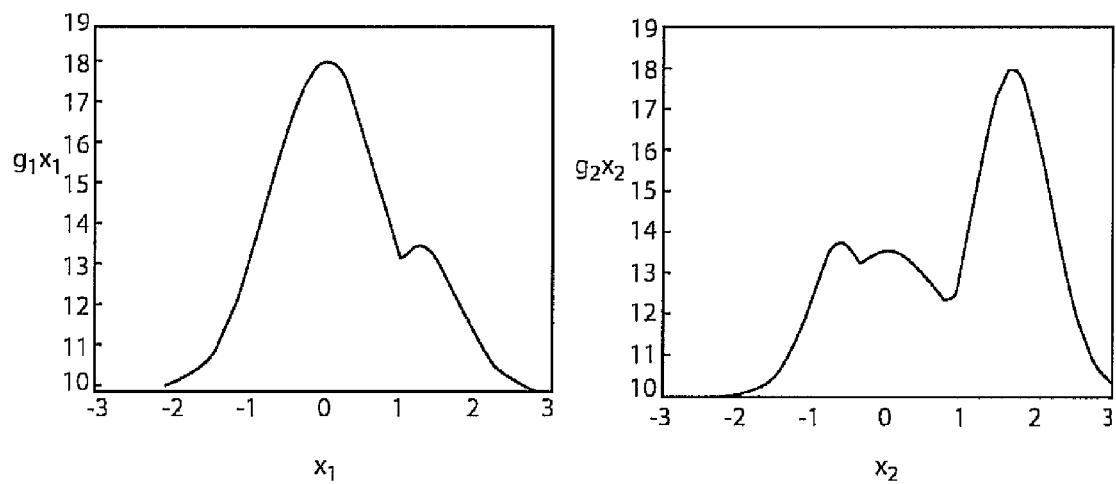
FIG. 4 shows two plots of functions $g_1(x_1)$ and $g_2(x_2)$, respectively showing projections of the maximum functions of FIG. 3.

Referring to FIGS. 3 and 4, two projection functions, $g_1(x_1)$ and $g_2(x_2)$ are plotted in FIG. 4 of the function shown in FIG. 3 on the coordinates $x_1$ and $x_2$ respectively. Note $g_1(x_1)$ is the maximum of $(x_1, x_2)$ in FIG. 3 over all possible values of $x_2$ as opposed to the projection of $f(x_1, x_2)$ on $x_1$ for certain specific $x_2$ values. This is the same for the function $g_2(x_2)$. Now the optimal parameters in Eq. (8) can be re-expressed in another form:

$$\bar{x}_i = \underset{x_i}{\operatorname{argmax}} g_i(x_i) \quad (11)$$

for $i=1, \ldots, p$. Based on such reformulation, if we know the corresponding $g_i(x_i)$ for each parameter $x_i$, the final solution can be obtained by solving p individual one dimensional optimization problems separately. Motivated by this observation, we develop a decentralized way of finding the optimal parameters. If the range of parameter value $x_i$ is denoted as $I_i$, the system utility function $f(\bullet)$ is then defined in the parameter space $I=I_1 x \ldots x I_p$. Here, we assume the function $f(\bullet)$ is continuous so that the existence of optimal point $\tilde{x}=[\tilde{x}_1, \tilde{x}_2, \ldots, \tilde{x}_p]^T$ is guaranteed. We divide the range $I_i$ of each parameter $x_i$ into r non-overlapping intervals $\Delta_1, \Delta_2, \ldots, \Delta_r$. A sample $x=[x_1, \ldots, x_p]$ is then a p dimensional vector, in which each element $x_i$ is drawn from one of its r bins.

One aspect of our active sampling approach is to identify the bin that includes an optimal value $\bar{x}_i$. Once we can localize such optimal region, we can always generate near optimal samples from that area. The final solution is then obtained by performing a local search based on those near optimal values. The inference of the optimal bin for each parameter is based on history samples and their related function values. It can be performed for each parameter individually. Therefore, in the following, we focus on the procedure of generating a new value $x_i^{(m+1)}$ for the parameter $x_i$ based on the inference of its optimal bin from past samples.

Given m history samples $x^{(k)} = [x_2^{(k)}, x_2^{(k)}, \ldots, x_p^{(k)}]$ with $k=1, \ldots, m$; and their related function values $f(x^{(k)})$, we can get $\tilde{m}$ evaluations of projection function $\hat{g}_i(x_i)$ on the coordinate $x_i$, $\hat{g}(x_i^{(l)}), \ldots, \hat{g}(x_i^{(m)})$, based on $$\hat{g}_i(x_i^{(k)}) = \max_{x_i = x_i^{(k)}} \{f(x^{(k)}) \mid k = 1, \ldots, m\}. \quad (12)$$

Note $\hat{g}(\bullet)$ is the estimation of function, $g(\bullet)$ based on available samples, and $\tilde{m} \leq m$ because some values of $x_i$ in the previous m instances, $\{x_i^{(1)}, \ldots, x_i^{(m)}\}$ may be the same. Based on the fit observations of $g_i(xi)$, we define a best utility vector $\Psi=[\psi_1, \psi_2, \ldots, \psi_r]$ for parameter $x_i$ to represent the best utility from past samples where $x_i$ is from each individual bin. That is, each element $\psi_j$ in $\Psi$ represents the maximum value of $\hat{g}_i(x_i)$ on previous samples where $x_i$ is from bin $\Delta_j$:

$$\psi_j = \max_{x_i^{(k)} \in \Delta_j} \hat{g}(x_i^{(k)}). \quad (13)$$

The value $\psi_j$ reflects the importance of the bin $\Delta_j$ for generating new samples. For example, if the element $\psi_j$ is the largest in $\Psi$, it is more likely that the optimal sample element $\tilde{x}_i$ is from bin $\Delta_j$. Such information is utilized to guide the generation of a new sample $x_i^{(m+1)}$. Due to the uncertainties caused by the bin discretization and limited previous sample size, we propose a probabilistic sampling strategy to generate $x_i^{(m+1)}$, in which a probability vector, $$P = [p_1, p_2, \ldots, p_r] \text{ with } \sum_i p_i = 1 \quad (14)$$

is defined to represent the preference of each bin from which the new sample $x_i^{(m+1)}$ will be generated. The value of each element in probability vector P is closely related to the element values of vector $\Psi$. For example, if $\psi_j$ is the largest element in $\Psi$, we need to draw $x_i^{(m+1)}$ from the bin $\Delta_j$ with high probability $p_j$. Moreover, both the best utility $\Psi$ and the probability vector P will get updated once we get the evaluation results of a new sample.

The probability vector P is initialized as $P=[1/r, 1/r, \ldots, 1/r]$ at the beginning. Suppose we have the current probability $p^{(m)}=[p_1^{(m)}, p_2^{(m)}, \ldots, p_r^{(m)}]$ and the best utility vector $\Psi^{(m)}=\psi_1^{(m)}, \psi_2^{(m)}, \ldots, \psi_r^{(m)}$ after m samples have been evaluated, the new value $x_i^{(m+1)}$ is then generated from one of its bins $\Delta_j$ with probability $p_j$. Concretely, we generate a random variable u between 0 and 1. Based on that variable, the new value $x_i^{(m+1)}$ is originated from its lth bin $\Delta_l$ if:

$$\sum_{j=1}^{l-1} p_j^{(m)} \leq u \leq \sum_{j=1}^{l} p_j^{(m)}. \quad (15)$$

After we have generated the new values of all parameters $x^{(m+1)} = [x_1^{(m+1)}, \ldots, x_p^{(m+1)}]$, we test the system to get the its utility $f^{(m+1)}(x^{(m+1)})$ under that new configuration setting. For simplicity, we use $f^{(m+1)}$ to represent the utility value of new sample $x^{(m+1)}$. Based on the new utility, the probability vector of $x_i$ is updated, $p^{(m)} \rightarrow p^{(m+1)}$.

Our probability updating rule is described where the probability vector updating based on the utility of new sample and current best utility vector is performed. Given the utility vector $\Psi^{(m)} = [\psi_1^{(m)}, \psi_2^{(m)}, \ldots, \psi_r^{(m)}]$ and the probability vector $p^{(m)} = [p_1^{(m)}, p_2^{(m)}, \ldots, p_r^{(m)}]$ for parameter $x_i$, as well as the utility value $f^{(m+1)}$ generated by the new sample whose element $x_i^{(m+1)}$ is drawn from the lth bin of $x_i$, Probability updating includes the following:

$$/* \text{ generating } P^{(m+1)} = [p_1^{(m+1)}, p_2^{(m+1)}, \ldots, p_r^{(m+1)}] */ \quad (16)$$

for all $j = 1, \ldots, r$ and $j \neq l$ if $\psi_j^{(m)}$ is larger than $f^{(m+1)}$, then $$p_j^{(m+1)} = p_j^{(m)} + \lambda(\psi_j^{(m)} - f^{(m+1)})(1 - p_j^{(m)})\frac{p_i^{(m)}}{r-1}$$

if $\psi_j^{(m)}$ is smaller than (or equal to) $f^{(m+1)}$, then (17)

$$p_j^{(m+1)} = p_j^{(m)} + \lambda(f^{(m+1)} - \psi_j^{(m)})p_j^{(m)}$$

for $j = l$ (18)

$$p_l^{(m+1)} = 1 - \sum_{j \neq l} p_j^{(m+1)}.$$

We label the r bins of $x_i$ into three groups based on the comparison of their related best utility values and the new utility $f^{(m+1)}$. The first group includes those bins whose best utility $\psi_j$s are larger than new utility $f^{(m+1)}$. We increase the probability of those bins using Eq. (16) to enhance the importance of those bins. On the other hand, for those bins in the second group whose best utility $\psi_j$ are lower than the new utility $f^{(m+1)}$, we decrease their related probabilities by equation (17) The last group includes only one element, the lth bin from which $x_i^{(m+1)}$ has been generated. Its probability is updated by normalization as described in Eq. (18) which might result in either an increase or a decrease of the probability depending on how high or low the new utility $f^{(m+1)}$ is compared to best utility values of other bins.

The probability updating rules (e.g., Eqs. (16), (17) and (18)) may be substituted for using other equation, e.g., form automata based machine learning theory, etc. With the proper choice of parameter $\lambda$, Eqs. (16) will lead the probability vector to converge to a unit vector $\bar{P}=[0, \ldots, 0, 1, 0, \ldots, 0]$ with the element '1' for the bin including the optimal point $\bar{x}_i$. The value of $\lambda$ determines the convergence speed of the iterative processes. If one chooses a small $\lambda$, the search process is very slow, but the probability of finding the global optimal is high. A large $\lambda$ implies faster convergence, but does not guarantee a global optimal point. To balance such 'exploration' and 'exploitation' efforts in the search process, we define another parameter 'initial sample size'.

In the experiment described herein, we start with $\lambda=0$ for the first 'initial sample size' number of samples, which is equivalent to the random uniform sampling in the parameter space. For the later iterations, we set $\lambda$ as a constant value. Note the selection of the constant $\lambda$ value also has to consider the range of system utility values to make sure the updated probability value is between 0 and 1.

Besides the parameter $\lambda$, the following factors also contribute to the probability increase or decrease, $\Delta p_j = p_j^{(m+1)} - p_j^{(m)}$ in each iteration.

The difference between the current maxim utility $\psi_j^{(m)}$ and the newly observed utility $f^{(m+1)}$. Large difference value will cause large amount of probability change, and vice versa.

$(1-p_j^{(m+1)})$ for the probability increase and $p_j^{(m)}$ for the probability decrease. As we know, the probability vector P will eventually converge to a unit vector with one for the bin including the optimal point and zeroes for other bins. The role of $(1-p_j^{(m+1)})$ or $p_j^{(m)}$ is to reduce the magnitude of probability change as the value gets closer to its end state (one or zero), so that oscillations around the convergence point can be avoided.

$$\frac{p_l^{(m)}}{r-1}$$

for the probability increase. This provides a conservative way to increase the probability based on the importance of the lth bin from which $x_i^{(m+1)}$ is generated. Large $p_1^{(m)}$ means that $x_i^{(m+1)}$ is more likely to be from the bin including the optimal point. Hence, the amount of probability increase can be large. However, when $p_1^{(m)}$ is relatively small, the probability increase has to be small accordingly.

The best utility vector $\Psi^{(m)}$ is also updated once we get $f^{(m+1)}$:

$$\psi_1^{(m+1)} = \max(\psi_1^{(m)}, f^{m+1})$$ (19)

$$\psi_j^{(m+1)} = \psi_j^{(m)} j=1, \ldots, r, j \neq 1$$ (20)

Then, the next round sampling and probability updating begin again. Eventually, the bin that includes the optimal configuration point will be identified. We collect samples within that bin and use a quadratic curve to fit the utility function in that region, $f=ax_i^2+bx_i+c$. The final solution $\tilde{x}_i$ is then obtained by applying the gradient to the fitted function, $\tilde{x}_i=-b/2a$.

Decentralized Implementation: Since the search process of each configuration parameter is an independent module, the present embodiments can be implemented in a decentralized fashion to meet the demand of large scale parameter optimization.

Figure 5:
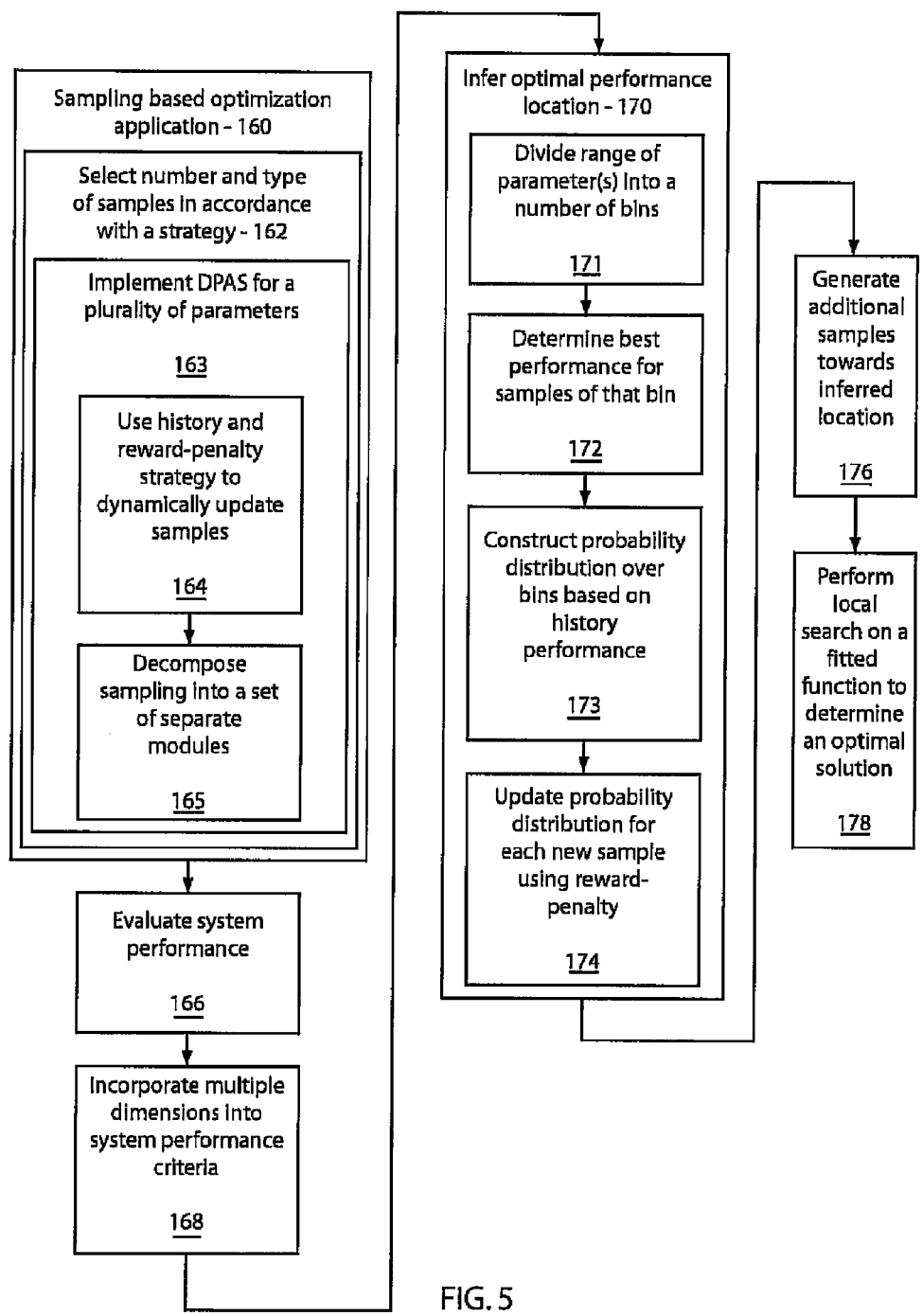
FIG. 5 is a block/flow diagram showing a system/method for optimizing a computing system configuration in accordance with one illustrative embodiment.

Referring to FIG. 5, a block/flow diagram showing a system/method for optimizing system performance is illustratively shown. In block 160, sampling based optimization is applied to identify optimal configurations of a computing system. This includes the following. In block 162, a number of configuration samples are selected. The selection of the samples is preferably performed in accordance with a strategy. For example, the strategy should consider both global coverage samples and local structure to determine the number of samples in a configuration space. The selection of a number of configuration samples preferably includes implementing a decentralized probability based active sampling (DPAS) method, in block 163, to employ a plurality of configuration parameters. The DPAS includes a sampling strategy which utilizes experience from past samples; and builds a probability for generating new samples based upon historic data from the past samples. Building the probability includes dynamically updating each evaluated sample based on a reward-penalty strategy so that the reward-penalty strategy leads a search process towards an optimal setting in block 164.

In block 165, the sampling may be decomposed into a set of separate modules, where each module is responsible for a search of a specific configuration parameter.

In block 166, system performance is evaluated based on the samples. In block 168, multiple performance dimensions are simultaneously incorporated to permit a definition of acceptable system performance.

In block 170, based on feedback of evaluated samples, a location of an optimal configuration is inferred. The may include, in block 171, dividing a range of a parameter into a number of bins, and determining a best observed performance evaluation from test samples originated from that bin in block 172. In block 173, a probability distribution is constructed over the bins based on best history performances for the bins where if one bin has encountered a higher evaluation score than other bins, that bin gets a high probability for generating new samples. In block 174, the probability distribution is updated every time a new sample has been evaluated using a reward-penalty based method. In block 176, additional samples are generated towards the location of the inferred optimal configuration to further optimize a system configuration. In block 178, a local search based on a fitted function is performed to obtain a solution.

Figure 6:
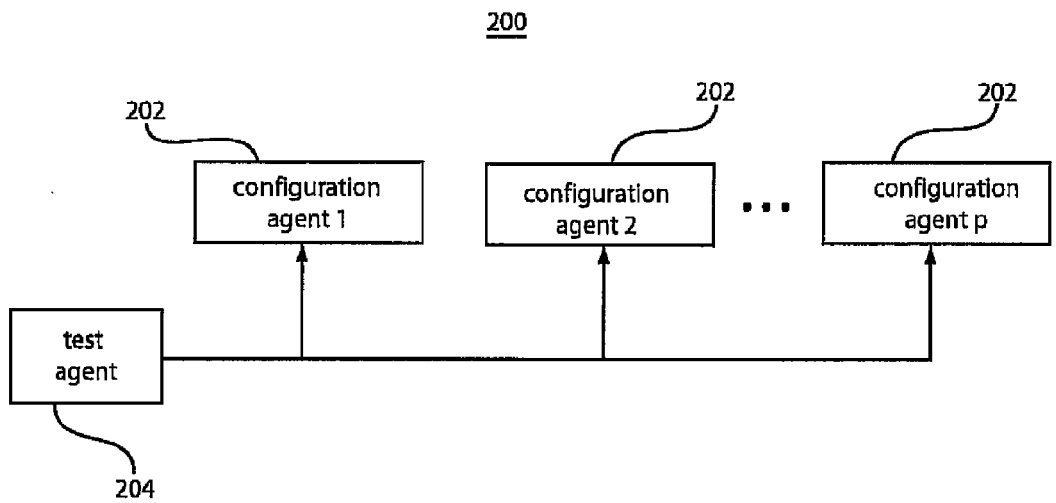
FIG. 6 is a block diagram showing a test system architecture that is decentralized in accordance with one illustrative embodiment.

Referring to FIG. 6, an architecture 200 depicting a plurality of configuration agents 202 working in parallel with a test agent 204 is illustratively shown. Each configuration agent 202 is responsible for searching the optimal value of a specific configuration parameter. The agents 202 can be distributed in different physical machines where their related configuration parameters are located. The test agent 204 is a module that performs configuration evaluation such as generating test workload and collecting the performance data for each evaluation process.

Figure 7:
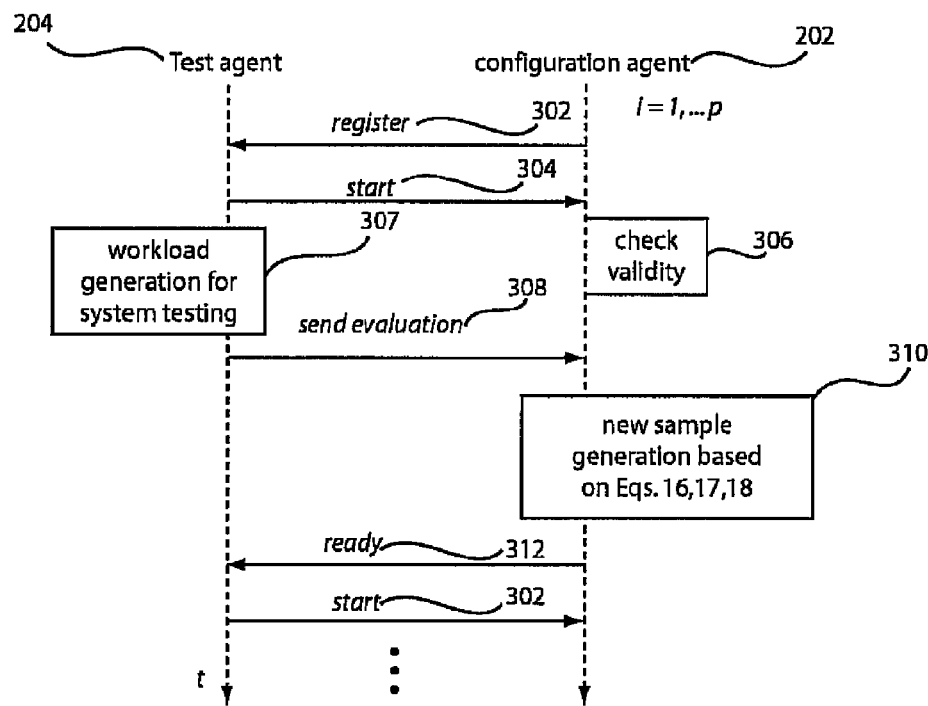
FIG. 7 is a diagram showing communications between a test agent and configuration agents in the system architecture of FIG. 6.

Referring to FIG. 7, a relationship between the test agent 204 and each configuration agent 202 is illustratively shown. The configuration agent 202 needs to register (302) itself with the test agent 204 before it starts the optimization process. At the beginning of each evaluation, the test agent 204 sends a "start experiment" or "start evaluation" command (304) to the configuration agents 202. Upon receiving command 304, the configuration agent 202 will check the validity of the current configuration setting in block 306. In web based systems, a reboot may be needed of the related component to make the configuration setting take effect. The test agent 204 then generates test workloads for the system and measures the system performance under those workloads in block 307.

After the evaluation has been finished, the test agent 204 computes a utility score based on equation (7) and broadcasts the results (308) to all the configuration agents 202. Once the configuration agent 202 obtains the new result, it updates its generation probability based on Eqs. (16), 17, and (18) in block 310 and then produces a new test value for the next evaluation. A 'ready' signal 312 is also sent to the test agent so that the next round evaluation can start once the test agent receives the notification from all configuration agents 202.

Referring again to FIG. 6, the present decentralized implementation brings a number of benefits for many applications, especially for those having a large number of configuration parameters distributed across a variety of nodes in the system. First, the present implementation saves computation time for the optimization process by allocating the optimization to each individual configuration agent 202, which is helpful when the number of configuration parameters is large. Such implementation also avoids the large memory needed for storing the utility vectors and probability distributions over the whole parameter space. Each configuration agent 202 only stores the projections of those values on the space of its related parameter.

Another attractive feature of this implementation is that it is easy to add or remove configuration agents 202 in the system 200, just by registering or deregistering itself with the test agent 204. The architecture 200 is independent of the number of parameters to be optimized. Furthermore, since each configuration agent 202 is working separately, in some applications we can speedup the optimization by treating the agents differently based on our prior system knowledge of configuration parameters. For example, if we know that some configuration parameters have a simple relationship with the system performance, e.g. monotonic relationship, we can increase their related updating coefficient λ in Eqs. (16) and (17) to avoid some unnecessary exploration operations in the search process and hence speedup the optimization.

While each agent 202 is responsible for the optimization of one configuration parameter, several parameters can come under one configuration agent 202 in practice. Parameter grouping may be based on the physical locations of configuration parameters as well as their dependency relationships. For example, if we know two parameters have strong dependencies, they can be tuned together in one agent 202. In this case, the best utility Ψ and probability distribution are two dimensional matrices rather than vectors. Such grouping may speedup the convergence of optimization process because the agent can have a better global view of parameter evolutions and hence avoid some unnecessary trials in the sampling.

Note our decentralized implementation does not mean that dependencies between different attributes is ignored. The parameter $x_i$ depends on parameter $x_j$ if and only if different settings of $x_j$ lead to different best values for $x_i$. In DPAS, the search process of each parameter $x_i$ is carried out without fixing other parameters. That is, the configuration agents 202 share the performance evaluations of past samples which are contributed by all the configuration parameters. Such shared information embeds the parameter dependencies in the optimization process. The following experimental results also demonstrate that the decentralized techniques will not degrade the performance of optimization.

EXPERIMENTAL RESULTS: We use both synthetic data and a real test bed system to demonstrate the effectiveness of the DPAS system/method in discovering the optimal point in the parameter space. The performance of our approach is also compared with other current configuration optimization techniques.

Synthetic Data: We use the known Rastrigin function to illustrate the optimization process of our DPAS method. The Rastrigin function is a commonly used benchmark to evaluate black-box optimization techniques due to its highly multimodal shape. However, while such function is usually used for the evaluation of function minimizations, the DPAS method searches for the maximum value in the parameter space. Therefore, we use the negative of Rastrigin function in the experiment which is expressed as $$f(x) = -\left\{ N\beta + \sum_{i=1}^{N} (x_i^2 - \beta\cos(2\pi x_i)) \right\} \tag{21}$$

where N is the number of dimensions of input x, and β is a constant to control the shape of the function. As we can see, the function has a lot of local maxima, which is good for the evaluation of sampling algorithms.

we choose λ=0.05 for the probability updating in equations (16), (17), and limit the number of search steps within 200. While the evaluations samples were uniformly scattered at the beginning, they are distributed towards the optimal regions as the optimization proceeds. The search algorithm proceeds towards the real function maximum. The best sample was discovered at the 120th evaluation. However, due to the probabilistic nature of the sampling, the method still explores the function space after that sample. Only after the 160th iteration, the method almost converges to the optimal region with only a few exploration actions such as the 187th sample. Such limited number of explorations is good for the search because it will help the process to escape the local function maximum if it can find more promising region in the global parameter space.

The present implementations were compared with existing algorithms such as simulated annealing (SA), the recursive random sampling (RRS) and smart hill climbing (SHC). We still use the negative Rastrigin function but with high dimension N=20. The parameter β in the Rastrigin function is chosen as 88 and the value range of each dimension is between −6 and 6. We also modify those algorithms so that instead of looking for function minima, we search for the maximum value of the function. Note all the optimizations were associated with several parameters. We list the values of those parameters used in our experiment in Table 1.

TABLE I

The parameter setting of each method in the performance comparison experiment:

| Algorithm | Parameter | Value |
|---|---|---|
| Simulate Annealing | Sample size at each temperature | 36 |
| | Initial temperature | 6 |
| Recursive Random Sampling | Initial sample size | 6 |
| | Neighborhood sample size | 8 |
| | Initial local search range | ½ |
| | Local search stop threshold | 1/10 |
| | Neighborhood shrink factor | 5/6 |
| Smart Hill Climbing | Initial LHS sample size | 6 |
| | Neighborhood sample size | 8 |
| | Restart LHSEXP sample size | 6 |
| | Threshold ratio to exploit | 1.8 |
| | Neighborhood shrink factor | 5/6 |
| | Initial local search range | ½ |
| | Local search stop threshold | 0.1 |
| DPAS | The number of bins for each variable | 50 |
| | Initial sample size | 30 & 50 |
| | Probability updating factor $\lambda$ | 0.05 |

For each algorithm, we limit the number of function evaluations within 2000. Considering the stochastic nature of the search process, we ran 50 trials of the optimization for each method and used the average results for the comparison.

Figure 8:
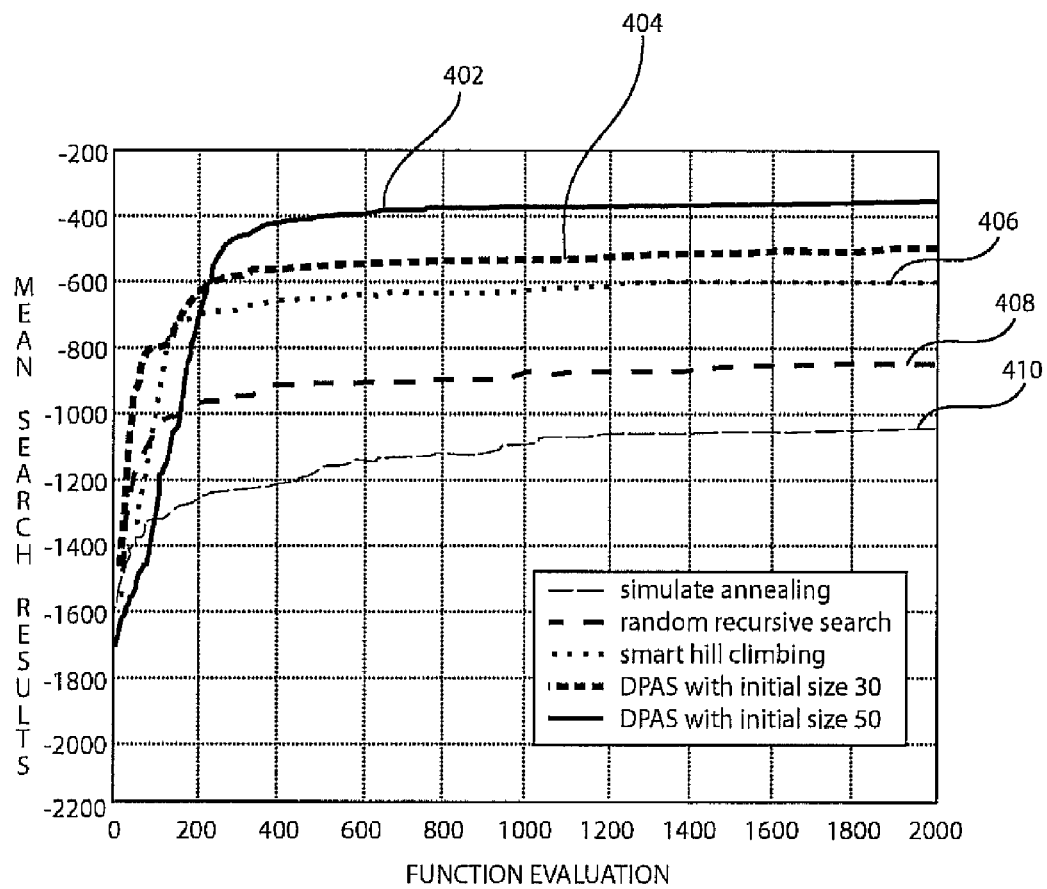
FIG. 8 is a plot of different methods for system optimization showing DPAS as superior to conventional methods.

Referring to FIG. 8, identified function maximums are presented at each function evaluation for SA, RRS, SHC and DPAS (initial size 30 and initial size 50). The higher two curves 402 and 404 after the 300th sample are the results of DPAS with the initial sample size 50 and 30 respectively. This shows that the DPAS with 50 initial samples achieves the best final results among all the methods. However, its performance is not competitive at the initial stage of the search (from 1 to 200 iterations). This is because the DPAS uses uniform random sampling to select the initial samples. Curve 404 after the 300th sample is the results of DPAS with 30 initial samples. This shows that the reduction of initial sample size can improve the performance at the initial stage. However, small initial sample size is more likely to lead the method to a local function maximum. In practice such a parameter can be chosen based on the time budget of search process to get the best tradeoff between good initial performance and final identified results.

In any case, DPAS performs better than the other methods, simulate annealing (SA) 410, random recursive sampling (RRS) 408 and smart hill climbing (SHC) 406. Furthermore, DPAS requires less tunable parameters compared with RRS 408 and SHC 406 methods, as shown in Table 1.

Real Test Bed: Our approach is also tested on a real e-commerce application which is based on a J2EE multi-tiered architecture. J2EE is a widely adopted platform standard for constructing enterprise applications based on deployable java components, called Enterprise JavaBeans (EJBs). We use Apache™ as a web server. The application server included a web container (Tomcat) and a BIB container (JBoss). MySQL runs at the back end to provide persistent storage of data. PetStore 1.3.2 is deployed as our test bed application. Its functionality consists of store front, shopping cart, put-chase tracking and so on. We built a client emulator to generate a workload similar to that created by typical user behavior. The emulator produces a varying number of concurrent client connections with each client simulating a session based on some common scenarios, which includes a series of requests such as creating new accounts, searching by keywords, browsing for item details, updating user profiles, placing order and checking out.

System performance is dependent on the parameters of the whole system rather than some individual components. For example, if there is a performance bottleneck in the web server due to some non-optimal configuration settings, the performance of whole system will be restricted no matter how the application server and database server are tuned. However, the system level configuration tuning introduces more parameters for the optimization task. For example, in the Apache™ configuration file 'httpd.conf', there are more than 240 uncomment lines that specify different service modules and parameters settings. The JBoss main configuration file 'jboss-service.xml' includes more that 70 attribute nodes to describe its parameters. In our experiment, we select a number of configuration parameters that are important to system performance and list them in Table 2. The prefix of parameter name ('W.', 'A.', or 'D.') denotes that the parameter comes from the web tier-, application server or database tier. The minimum to maximum values of those configurations as well as their default settings are also presented in that table.

It is not easy for human operators to manually tune those configuration parameters to maximize the system utility. Taking the configuration WMarClients in the Apache module as an example, while the system throughput will increase as that parameter increases, the system response time will increase as well due to the overhead of the processes in the web server which accept TCP connections. We need to find the best tradeoff between system throughput and response time that can maximize the system utility.

TABLE 2

The configuration parameters selected from different tiers of the system.

| name | min value | max value | default value |
|---|---|---|---|
| W. RequestTimeout | 50 | 500 | 300 |
| W.KeepAliveTimeout | 5 | 20 | 15 |
| W.MaxClients | 1 | 256 | 150 |
| A.KeepAliveTime | 10000 | 178000 | 60000 |
| A.MinimalPoolSize | 1 | 15 | 1 |
| A.MaximumPoolSize | 8 | 20 | 10 |
| A.MaximumQueueSize | 500 | 3300 | 1000 |
| A.TransactionTimeout | 200 | 900 | 300 |
| D.max_connections | 60 | 900 | 100 |
| D.key_buffer_size | 8388600 | $3.9 \times 10^9$ | 8388600 |
| D.table_cache | 64 | 900 | 64 |
| D.wait_timeout | 3600 | 54000 | 28800 |
| D.max_allowed_packet | 1048576 | $9 \times 10^8$ | 1048576 |
| D.query_cache-size | 0 | 4196 | 0 |

Furthermore, the optimal setting of W.MaxClients depends on the values of other parameters such as W.KeepAliveTimeOut of the web server because that configuration determines the number of client reserved connections and hence affects the actual maximum number of connections the system can afford.

Therefore, we use the sampling based optimization methods to automatically discover the optimal configuration setting for the test bed system. For each sample, we generate a workload to the system and measure the system performance under that specific configuration setting. The workload is represented as the number of concurrent users visiting the system. In the experiment, we generate an initial number of concurrent users at the beginning, followed by adding more users gradually until the system reaches its maximum capacity. The system operates in that high workload situation for a while and then gradually decreases the users until all users leave the system. For the whole evaluation period, the system warm up and cooling down occupy around 5 minutes, and the operation under the high workload takes more than 10 minutes. Note it is important to compare different configurations under high workloads because usually in that situation the system performance will vary a lot for different settings.

We compare the recursive random sampling (RRS), smart hill climbing (SHC) and our DPAS algorithms in discovering the configuration that can produce the highest system utility. Again, we modify the RRS and SHC algorithms so that they search for the function maxima instead of minimal values. In the utility calculation of Eq. (7), we choose a=0.01 and u=400 in Eq. (3) for the request response time expressed in milliseconds, $x_{max}$=200 in Eq. (5) for system throughput, and c=50 in Eq. (6) for the request rejection rate.

We choose $\lambda$=0.2, and the 'initial sample size' is 30. The DPAS method identifies the optimal region after the 100th sample and gradually converges to except some exploration samples. The method eventually discovers the best sample at the 135th iteration with utility value 2.6981. The results demonstrate that the DPAS method performs the best among the three algorithms.

Table 3 lists the performance of system default configuration and the best configurations identified by three methods in term of the average throughput, request response time, request rejection rate and final utility value. It shows that all the three methods can significantly improve the system performance compared with the default configuration setting. Among the three methods, the SHC finds its optimal configuration with the lowest response time, but the lowest system throughput as well. The best configuration identified by the RRS method has higher throughput than the solution of SHC method. However, it also brings considerable increase of response time. Compared with the RRS and SHC methods, the DPAS discovers the solution with the highest system utility. It achieves the highest throughput with little sacrifice of system response time. The request rejection rate is also the smallest among the solutions of the three.

TABLE 3

Performance comparison of the best configurations identified by RRS, SHC, and DPAS methods.

|  | Default | RRS | SHC | DPAS |
| --- | --- | --- | --- | --- |
| System throughput | 505.65 | 191.67 | 189.28 | 193.91 |
| Request response time | 183.54 | 70.40 | 42.44 | 53.08 |
| Request rejection rate | 0.0061 | 0.0061 | 0.0061 | 0.0057 |
| System utility | 2.2012 | 2.6500 | 2.6718 | 2.6981 |

An new approach to discovering optimal system configurations, which relies on a probabilistic model to actively sample the space of each parameter as well as a reward-penalty strategy to dynamically update that probability based on newly evaluated samples has been described. Experimental results have shown that our present method can identify better solutions compared with other configuration search methods. Furthermore, the present method can be easily implemented in a decentralized way, which is beneficial to the applications with a large collection of configuration parameters distributed across different units such as the distributed web based systems, large scale communication systems and so on.

While this paper uses fixed workload pattern to discover optimal configurations of the system, the system performance may be dynamically adjusted using settings according to the instantaneous value of system workload.

Having described preferred embodiments of a system and method discovering optimal system configurations using decentralized probability based active sampling (which are intended to be illustrative and not limiting), it is noted that modifications and variations can be made by persons skilled in the art in light of the above teachings. It is therefore to be understood that changes may be made in the particular embodiments disclosed which are within the scope and spirit of the invention as outlined by the appended claims. Having thus described aspects of the invention, with the details and particularity required by the patent laws, what is claimed and desired protected by Letters Patent is set forth in the appended claims.

What is claimed is:

1. A method for optimizing system performance, comprising:
   applying sampling based optimization to identify optimal configurations of a computing system by:
   selecting a number of configuration samples;
   evaluating system performance based on the samples;
   based on system performance feedback of evaluated samples, inferring a location of an optimal configuration; and
   generating additional samples towards the location of the inferred optimal configuration to further optimize a system configuration;
   wherein said selecting a number of configuration samples includes implementing a decentralized probability based active sampling (DPAS) method to employ a plurality of configuration parameters, said DPAS including a sampling strategy which utilizes experience from past samples; and the method further comprises building a probability for generating new samples based upon historic data from the past samples.

2. The method as recited in claim 1, wherein selecting a number of configuration samples includes considering global coverage samples and local structure to determine the number of samples in a configuration space.

3. The method as recited in claim 1, wherein building a probability includes dynamically updating each evaluated sample based on a reward-penalty strategy so that the reward-penalty strategy leads a search process towards an optimal setting.

4. The method as recited in claim 1, further comprising decomposing the sampling into a set of separate modules, where each module is responsible for a search of a specific configuration parameter.

5. The method as recited in claim 1, wherein evaluating system performance includes incorporating multiple performance dimensions simultaneously to permit a definition of acceptable system performance.

6. The method as recited in claim 1, wherein based on feedback of evaluated samples, inferring a location of an optimal configuration includes:
   dividing a range of a parameter into a number of bins; and
   determining a best observed performance evaluation from test samples originated from that bin.

7. The method as recited in claim 6, further comprising constructing a probability distribution over the bins based on best history performances for the bins where if one bin has encountered a higher evaluation score than other bins, that bin gets a high probability for generating new samples.

8. The method as recited in claim 7, further comprising updating the probability distribution every time a new sample has been evaluated using a reward-penalty based method.

9. The method as recited in claim 8, further comprising performing a local search based on a fitted function to obtain a solution.

* * * * *